MAGNETIC CORE MEMORY MATRIX WIRING REARRANGEMENT

Filed Jan. 11, 1966

INVENTOR.
RICHARD J. PETSCHAUER
BY Philip Schneider
Louis B. Applebaum
ATTORNEYS United States Patent Office 3,518,638

Patented June 30, 1970

3,518,638
MAGNETIC CORE MEMORY MATRIX WIRING REARRANGEMENT

Richard J. Petschauer, Edina, Minn., assignor, by mesne assignments, to the United States of America as represented by the Secretary of the Navy Filed Jan. 11, 1966, Ser. No. 520,306
Int. Cl. G11c *5/08, 11/06, 5/02*
U.S. Cl. 340—174 4 Claims

ABSTRACT OF THE DISCLOSURE

A method for reducing the mutual inductance of a magnetic core memory matrix of the type having at least two sets of orthogonal coincident-current drive lines (the X- and Y-drive lines) and one set of special purpose drive lines (the delta-drive lines) which are simultaneously activated. The X- and Y-drive lines link all cores in orthogonal sets of straight lines and the delta-drive lines link the cores in accordance with some predetermined ordering rule in curved lines. The method consists of straightening out the delta lines so that they become orthogonal to the lines of one of the other two sets of drive lines, the remaining set now constituting the curved set.

This invention relates to magnetic core memory matrices and especially to a rearrangement of the drive lines of a magnetic core memory matrix whereby the mutual inductance of one set of drive lines is substantially reduced.

The usual coincident-current magnetic core memory matrix has orthogonal sets of vertical and horizontal (as drawn in a schematic diagram) drive lines, called the X- and Y-drive lines, for storing data in the memory cores. The coincidence of current in the X and Y lines linking a particular core stores a bit of data in that core. The sets of X- and Y-drive lines can be called the coincident-current drive lines.

In addition to this usual type of data storage, it is possible to process data requiring special mathematical treatment. One example of this is found in equipment used for processing special computer data, such as the readings and signals obtained by sensor means from a variety of available sensing equipments. In such cases, the coincident-current memory can be wired in special ways to materially simplify the processing of the data involved. Thus there may be another set of special-purpose drive lines, called delta-drive lines. The X and Y lines have a core at each intersection of the lines, but the delta and the X lines may not have a core at each of their intersections. The delta lines are strung in paths in accordance with some rule of ordering, depending on the particular functions to be performed by the matrix—for example, the delta lines may be strung in hyperbolically curved paths.

In such a memory matrix, the X- and Y-drive lines are ordinarily activated one at a time in successive order, but the delta-drive lines may be activated simultaneously. The simultaneous activation of the delta lines and the additional length of these lines in comparison with the length of the Y lines, for instance, result in excessive mutual inductance for the matrix and higher impedance for each of the delta lines. The excessive mutual inductance is usually undesirable and must be reduced. One method of reducing the inductance is to use a ground plane but, in this case, the large number of delta lines causes a bunching problem which keeps individual delta lines at different heights relative to the ground plane, thereby diminishing the effectiveness of the plane with respect to the delta lines which lie at the topmost level.

The objects and advantages of the present invention are accomplished by interchanging the sets of the Y- and the delta-drive lines so that the delta-drive lines are straightened out and orthogonal to the X-drive lines, thereby shortening the lengths of the delta-drive lines and reducing the mutual inductance of the magnetic core matrix.

An object of this invention is to reduce the mutual inductance of the type of magnetic core matrix which has a pair of orthogonal sets of coincident-current drive lines and at least one set of curved, special-purpose drive lines.

Other objects and many of the attendant advantages of this invention will be readily appreciated as the same becomes better understood by reference to the following detailed description when considered in connection with the accompanying drawings wherein.

Figure 1:
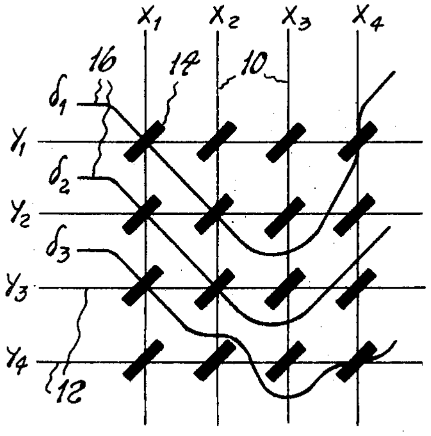
FIG. 1 is a schematic diagram showing a segment of a conventional magnetic core memory matrix with a set of special-purpose delta-drive lines.

FIG. 1 shows the arrangement of a conventional magnetic core memory matrix. Such a matrix has two sets of orthogonal drive lines, the X lines 10 (vertical in the diagram) and the Y lines 12 (horizontal in the diagram). For convenience, only four lines in each set are shown. A magnetic core 14 is placed at each intersection of the X and Y lines, and each core is magnetically linked or threaded by the drive lines. For the sake of clarity the bias and sense lines which are conventionally employed are not shown here.

A third set of drive lines, the delta-drive lines 16, threads the cores in a manner determined by the need for inserting data into the cores and performing special-purpose mathematical operations on the recorded data. For example, in FIG. 1, the delta lines take paths which are roughly in the form of sections of hyperbolic curves. Not all cores are linked by the delta lines; thus, the cores at the $X_1$–$Y_4$, $X_2$–$Y_1$, $X_3$–$Y_1$, intersections, for examples, are not threaded by delta lines.

Figure 2:
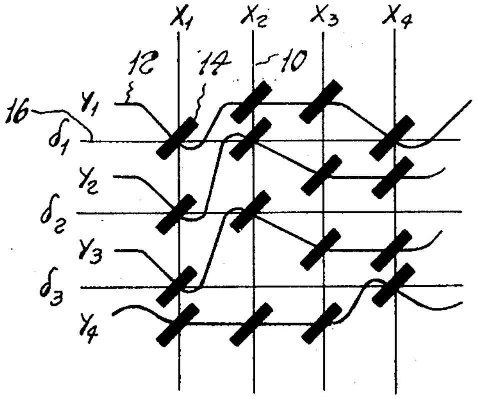
FIG. 2 is a schematic diagram showing a rearrangement of the matrix of FIG. 1 according to the concept of the present invention.
Figure 3:
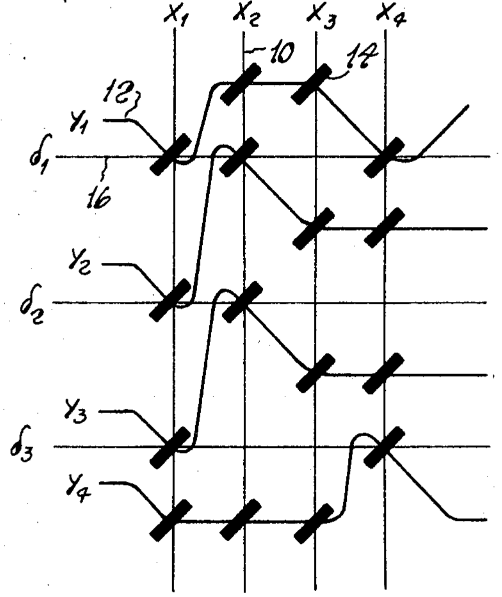
FIG. 3 is a schematic diagram showing how the matrix of FIG. 2 would look if the standard spacings of the matrix of FIG. 1 were employed.

The delta and the Y lines are rearranged in FIG. 2 by making the delta lines, rather than the Y lines, perpendicular to the X lines. The rearrangement is similar to what might happen if a person were to grasp the delta lines at their extremities in FIG. 1 and pull them taut; this would straighten out the delta lines and simultaneously pull the Y lines into curved paths which would slide the cores along their respective wires until the physical arrangement shown in FIG. 2 is attained.

A disadvantage of this straightening process is that the core spacing would be reduced to about half of what it was, thereby making it difficult to utilize conventional core assembly jigs and techniques. However, the conventional jigs and techniques can be used simply by omitting to insert cores at the proper intersections, and conforming the lines to reproduce the original wiring plan. The final result looks simply like a vertical elongation of the wiring arrangement of FIG. 2.

In an actual system which was built, the matrix was a 192 x 480 line matrix, which contained four 99 x 120 line planes and four 93 x 120 line planes. The planes were divided into thirty-two 99 x 15 line frames and thirty-two 93 x 15 line frames. Each frame was also linked by 100 delta lines, a sense line and a bias line. The 100 delta lines ran perpendicular to the 192 X lines, and the 480 Y lines were strung across the plane in an irregular pattern determined by the original tabulation of delta lines. Binary information was inserted in the cores by means of the coincident current drives (X and delta lines). Information was read out of the cores using linear selection on the Y lines. An analog summation of core voltages was impressed on the sense winding by simultaneously resetting a number of cores on the same sense winding.

Obviously many modifications and variations of the present invention are possible in the light of the above teachings. It is therefore to be understood that within the scope of the appended claims the invention may be practiced otherwise than as specifically described.

I claim:

1. A process for reducing the mutual inductance of a magnetic core memory matrix of the type having at least two sets of orthogonal coincident-current drive lines (the X- and Y-drive lines) and one set of special-purpose drive lines (the delta-drive lines) which are intended to be activated simultaneously, the X- and Y-drive lines linking all the cores and the delta-drive lines linking the cores in accordance with some predetermined ordering rule, the orthogonal sets consisting of straight lines and the delta set consisting of curved lines, said process comprising the step of:

straightening out said delta lines so that they become orthogonal with the lines of one of the other sets of drive lines, whereby the cores are rearranged, and the third set of drive lines which originally was an orthogonal set now constitutes the curved set of lines.

2. The process set forth in claim 1, wherein said one set is the X set and said other set is the Y set, said Y set becoming the curved set of lines.

3. The step for reducing the mutual inductance of the matrix in the method of making a magnetic core memory matrix having at least two sets of orthogonal coincident-current drive lines (the X- and Y-drive lines) and one set of special-purpose drive lines (the delta-drive lines) which are to be simultaneously activated, the X- and Y-drive lines linking all the cores and the delta-drive lines linking the cores in accordance with some predetermined ordering rule, the orthogonal sets consisting of straight lines and the delta set consisting of curved lines, comprising:

straightening out said delta lines so that they become orthogonal with the lines of one of the other sets of drive lines, whereby the cores are rearranged, and the third set of drive lines which originally was an orthogonal set now constitutes the curved set of lines.

4. The step set forth in claim 3, wherein said one set is the X set and said other set is the Y set, said Y set becoming the curved set of lines.

References Cited

UNITED STATES PATENTS

| | | | |
|---|---|---|---|
| 3,381,282 | 4/1968 | Flaherty et al. | 340—174 |
| 3,223,982 | 12/1965 | Saceroti et al. | 340—172.5 |
| 2,968,029 | 1/1961 | Grosser | 340—174 |

JAMES W. MOFFITT, Primary Examiner